Feb. 28, 1950 H. C. KESSLER, JR 2,499,100
METHOD FOR OBTAINING COLOR REGISTRY
IN OFFSET PRINTING
Filed Oct. 19, 1946
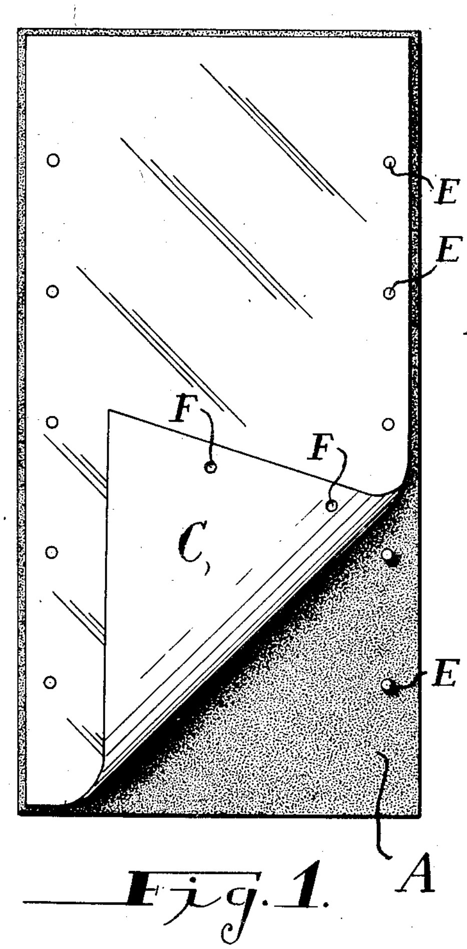
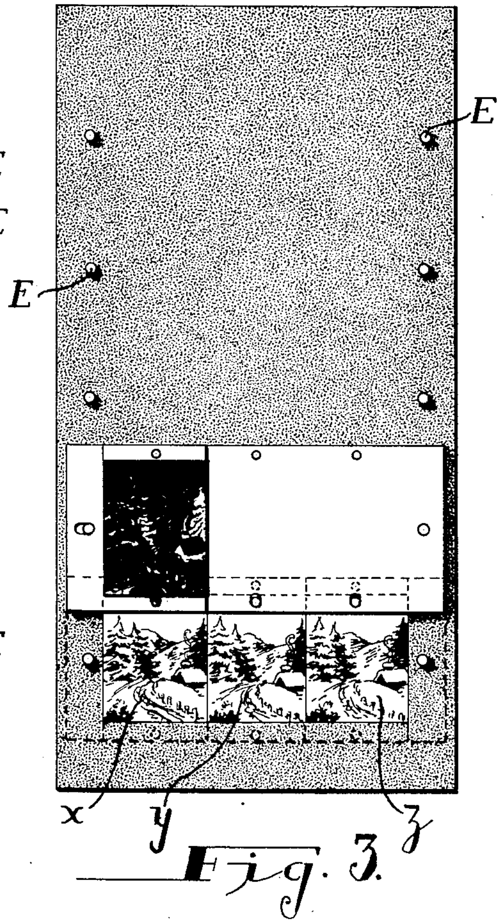
Fig. 1. Fig. 3.
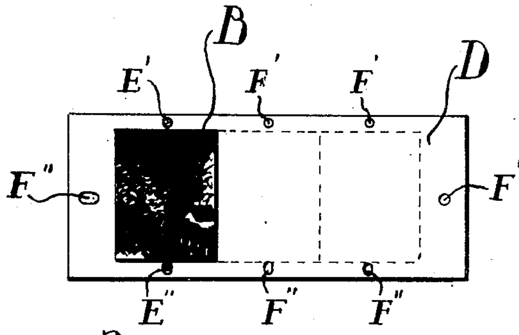
Fig. 2.
INVENTOR.
Harry C. Kessler, Jr
BY
[signature]
ATTORNEYS Patented Feb. 28, 1950

2,499,100

UNITED STATES PATENT OFFICE 2,499,100

METHOD FOR OBTAINING COLOR REGISTRY IN OFFSET PRINTING

Harry C. Kessler, Jr., Drexel Hill, Pa.

Application October 19, 1946, Serial No. 704,474

1 Claim. (Cl. 95—5.1)

This invention relates to an improvement in the art of lithographic printing and, more particularly, relates to means and method for facilitating the preparation of plates for the production of multicolor copy with accuracy of registration of the colors.

Heretofore the preparation of printing plates for the production of multicolor copy has, for an approach to accuracy of register of the several colors, involved careful and expensive handwork in the preparation of a layout and in the stripping of the several color negatives; or, for greater accuracy of register, the use of a composing machine obtainable only at a high cost due to the extreme accuracy of its parts for effecting registry of the negatives.

Now in accordance with this invention means are provided whereby printing plates for producing multicolor copy with exact hairline color registry may be produced simply and inexpensively, whether the plates involve a single composition, or the more usual step and repeat work in connection with which great saving of expense over prior procedure and extreme accuracy of color registry is obtained.

Generally speaking according to this invention means are provided for positioning a plurality of negatives corresponding to the several colors in identical position successively on a transparent strip, or negative holder, and for positioning the strip in identical position on a succession of plates for exposure.

In the application of this invention to step and repeat work means are provided for positioning the negatives in a plurality of different identical positions on the strip and for positioning the strip in a plurality of different identical positions on successive plates.

As will appear, positioning in one direction, as horizontal or transverse, will be obtained by the means for positioning the several color negatives on the strip and positioning in the other direction, as vertical, will be obtained by the means for positioning the strip on the plates.

In the more detailed description of this invention, it will, it is believed, be unnecessary to describe the preparation, as graining and sensitizing, of the plates or procedure for their exposure, since the plates will be prepared and exposed by any procedure and with apparatus well known to the art.

Having now indicated in a general way the nature and purpose of this invention, I will proceed to a detailed description of a practical adaptation thereof in connection with offset printing from which its application to lithography generally will be apparent and from which procedure according to the method wil be made apparent, all with reference to the accompanying drawing, in which:

Figure 1 is a plan view of an offset printing plate, grained but not sensitized, partially overlaid by a template for application to the plates of means for positioning a negative carrying strip on the plates for step and repeat work.

Figure 2 is a plan view of a negative holder showing means for positioning a negative thereon in a plurality of positions and means for engaging with the strip positioning means on the plate, a negative being shown positioned on the negative holder.

Figure 3 is a plan view of a sensitized plate with the negative holder positioned thereon for exposure, previous exposures of the negative having been made.

In the several figures A indicates the usual zinc press plate used in offset printing and B indicates a color negative prepared in the usual manner for the preparation of offset printing plates for the production of multicolor copy.

C indicates a template which may be formed of any suitable material, as paper, plastic, metal, or the like, while D indicates a strip upon which the negative B is positioned. The strip D is of material which is sufficiently transparent to permit exposure of the negative to the plate through it and which desirably will not expand or contract under the influence of moisture, as, for example, humidity. The strip C will desirably be formed of plastic, acetate sheet, glassine paper, or other transparent material.

E and E′ indicate dowels secured to the plate A and negative B, respectively; and F and F′ indicate holes punched in the template C and strip D, respectively, it being noted that the holes F′, F″ at one end of the strip D and along one edge are elongated.

The template C is first prepared by punching therein the holes F at intervals along opposite edges, for example, along its side edges as shown in Figures 1. The interval between the holes F will be governed by the size of the negative and will be laid out on the template by accurate measurement, or the punching may be accomplished with a micrometer punch so that the holes will be accurately spaced.

After the template has been punched, it is laid over a plate A, intended for printing one of the colors of a multicolor job, and the dowels E secured to the plate through the holes F. The dowels may be of any suitable material, as, for example, cardboard, and may be secured to the plate by, for example, glue.

Assuming that the job in hand involves three colors, red, blue and yellow, three identical plates, one for the printing of each color, are provided with dowels E with use of the template C as described above, with the result that the dowels E on each of the plates will be in exactly the same position.

The strip D, or negative holder, is laid out by laying out on the strip, approximately midway between its upper and lower edges, a transverse line corresponding to the vertical or transverse fitting marks on the center line of the copy, the copy having been prepared in the usual manner, and then laying out on the strip at right angles to said line, vertical lines, depending upon the number of repeats of the negative, corresponding to the transverse or vertical fitting marks on the copy.

The holes F', F'' are then punched adjacent the ends of the strip centered on the line extending transversely of the strip. One of these holes, for example, F'' is elongated. The holes F', F'' are then punched on lines equidistant from the transverse line and adjacent to the upper and lower edges of the strip. The holes adjacent one of the edges, for example, the holes F'', are elongated.

The plate A and strip D, or negative holder, having been prepared as described above, the several color negatives, upon which appear the fitting marks of the copy, are successively positioned beneath the strip D through the medium of the fitting marks and dowels E' affixed to them through a pair of the holes F' and F'' adjacent the upper and lower edges of the strip.

Proceeding now to the preparation of the several color plates, a negative B representating one of the colors, for example, red, is positioned on the strip D by registering the dowels E' carried by the negative with opposite holes F', F'' in the sides of the strip, for example, at the left end of the strip as shown in Figure 2. The negative so positioned on the strip is secured thereto by, for example, lengths of Scotch tape. The elongated hole F'' at one side of the strip will insure that the negative will lay perfectly flat on the strip.

The strip D, carrying the negative B, will then be positioned on the plate A with the holes F', F'' in its ends engaged with an opposite pair of dowels E on the plate A, say, for example, the lower pair shown in Figure 3. The elongated hole F'' at one end of the strip will insure that the strip D and negative carried thereby will lay perfectly flat on the plate.

With the strip and negative carried thereby positioned on the plate as described, the plate will be masked and exposed in the usual manner, which will result in producing the positive X on the plate for printing the color red.

After exposure of the plate the strip D will be removed, the negative secured in the center position on the strip, the strip again positioned on the plate and the plate exposed with production of the positive Y. And similarly the positive Z is produced. Then the procedure is repeated with the strip positioned on the plate through the medium of the successive opposite dowels E until the plate is filled with repeats. The plate is then finished in the usual manner.

The plates for printing the blue and yellow impressions will be prepared as described above using the blue and yellow color negatives in place of the negative B.

It will now, it is believed, be apparent that the negatives for the several colors will be in identical register on the strip D or negative holder through register of the dowels E' carried by the several negatives in the holes F', F'' at the sides of the strip and that the strip D will be, in its various positions, in exact register on the several plates by virtue of the engagement of the holes F', F'' at the ends of the strip with the dowels E, which will be in identical position on all of the several plates. Thus, in a word, the position of the negatives in one direction on the several plates will be fixed by the positioning of the negative on the strip D and in a direction at right angles by the positioning of the strip D on the plates. Hence, successive impressions from the several plates will produce exact color register.

While the above description of this invention illustrates a convenient practical embodiment thereof, it will be appreciated that various modifications may be made without departing from the broad aspects or from the scope of the appended claims.

Thus, it is contemplated that the plates A for the different colors may be punched in a pile, instead of being provided with dowels E, with elimination of necessity for use of the template C, in which case the strip D will be provided at its ends with dowels instead of with the holes F', F''.

Again, the strip D may be provided with dowels along its sides instead of with the holes F', F'' and the negatives for the several colors punched in a pile instead of being provided with dowels E'.

It will also be appreciated that while the above specific description illustrates the adaptation of this invention to step and repeat work, it is equally applicable to any multicolor work. Likewise, it will be appreciated that this invention is applicable to direct as well as offset lithography; and it will be appreciated that where in the claim appended hereto the term "negative" is used, it is intended that "positive" is a full equivalent.

What I claim and desire to protect by Letters Patent is:

In a method for the preparation of printing plates for producing multicolor printing, the steps comprising affixing spaced dowels in identical position on each of a plurality of identical sensitized press plates, forming in a transparent negative holder spaced holes having the same spacing as said dowels and sized to exactly receive said dowels, forming a plurality of pairs of equally spaced holes in said negative holder, affixing in identical position on each of a plurality of color negatives a pair of dowels having the same spacing as each of said plurality of pairs of holes in the negative holder and sized to exactly fit each of said pairs of holes, securing one of said color negatives to said negative holder with the pair of dowels thereon entered in one pair of said pairs of holes in the negative holder, laying said negative holder on one of said press plates with the pair of dowels thereon entered in said first mentioned pair of holes in said negative holder, masking the portion of the press plate not covered by the color negative, exposing, unmasking the press plate, shifting the color negative to another pair of said pairs of spaced holes in the negative holder, replacing the negative holder on the press plate, masking and exposing the press plate, removing the negative holder from the press plate and processing said press plate, removing the negative from the negative holder, securing a second of said color negatives to said negative holder with the pair of dowels thereon entered in the first pair of holes in said negative holder used by the first color negative, laying said negative holder on a second of said press plates with the pair of dowels thereon entered in said first mentioned holes in said negative holder, masking and exposing said press plate, removing the negative holder and shifting the negative to the second pair of holes utilized by the first colored negative, replacing the negative holder on said press plate, masking and exposing said press plate, removing the negative holder therefrom and processing said press plate.

HARRY C. KESSLER, Jr.

REFERENCES CITED

The following references are of record in the file of this patent:

UNITED STATES PATENTS

| Number | Name | Date |
|---|---|---|
| 761,945 | Cherrill | June 7, 1904 |
| 1,151,461 | Hatt | Aug. 24, 1915 |
| 1,650,132 | Jones | Nov. 22, 1927 |
| 1,787,662 | Boedicker | Jan. 6, 1931 |
| 2,385,599 | Ball et al. | Sept. 25, 1945 |

FOREIGN PATENTS

| Number | Country | Date |
|---|---|---|
| 2,533 | Great Britain | of 1911 |